United States Patent Office 3,117,866
Patented Jan. 14, 1964

3,117,866
ORALLY INGESTIBLE COMPOSITIONS AND
METHOD OF PREPARING SAME
Samuel J. Golub, Newton Centre, and Nathan E. Silbert, Swampscott, Mass., assignors to Activator, Inc., Boston, Mass., a corporation of Massachusetts
No Drawing. Filed Apr. 12, 1960, Ser. No. 21,577
14 Claims. (Cl. 99—2)

This invention relates to orally ingestible substances of distinct nutritional significance, capable of manifesting desirable biological characteristics in their diversified adaptations. More particularly, it pertains to novel compositions comprising a substantial content of chemically unsaturated components coordinated with other ingredients to afford the desired attributes in function and effect, and embraces within its scope features of procedure in their preparation.

Considerable interest has been directed to edible products containing chemically unsaturated substances, desirably of natural derivation, such as the various edible vegetable and animal oils. In this connection, there is a trend of reaction, based upon attendant study and research, that various types of fat containing or oleaginous type substances may result in progressive cholesterol increases in human as well as animal systems, and that edibles relatively high in unsaturated compounds tend to obviate such excessive cholesterol development in the course of the metabolic process. Thus there have been formulated prior art compositions, usually predicated on unsaturated vegetable or animal oils as aforesaid, and apart from any advantages that may have been attributed thereto, these products have usually been the subject of various shortcomings and deficiencies, such as lack of stability, difficulties encountered in attempts to administer appropriate dosages, et cetera. Moreover any attainment of the desired function and effect has generally been of minor or uncertain extent.

Concerning the problem of stability, this is of distinct significance in regard to products of the type contemplated. The importance thereof will be apparent from the realization that vegetable or animal oils, having a substantial content of unsaturates, tend to manifest a reduction in their unsaturation with the elapse of time even under normal atmospheric conditions. Moreover the rate at which the unsaturation is altered may be accelerated at higher temperatures, such as under conditions of heat treatment which may be resorted to in the preparation or processing of the desired products. Further pertinent to the stability aspects, unsaturated compositions of the type designated are definitely subject to oxidative deterioration with attendant rancidity.

Not withstanding the reliance upon antioxidants or other types of preserving substances, the prior art formulations have nevertheless encountered uncertainties both with respect to the variation in the extent of unsaturation and relative to oxidative degradation, associated with objectionable rancidity. This has resulted from such factors as intervals of shelf storage frequently associated with commercial distribution, and the temperatures which may prevail under such circumstances, as well as any substantial heat treatment which may be applied.

Concerning the problem of administering appropriate dosages of compositions for attaining the desired effects, the permissible tolerance of unsaturated compositions, such as those of animal or vegetable oil derivation, has usually been below that essential for affording the contemplated benefits or results. Efforts to utilize amounts sufficient to afford the intended effects have resulted in exceeding the tolerance of the recipient, thereby frequently causing undesirable collateral physiological and/or pathologic reactions.

It is an object of this invention to obviate such difficulties and uncertainties as hereinabove indicated.

Another object contemplates novel compositions which embrace a comparatively high content of multibonded ingredients, such compositions being of distinctive nutritional value and adapted to afford enhanced biological effects in dosages of permissible therapeutic and metabolic tolerance.

An additional object pertains to novel edible compositions having a substantial content of chemically unsaturated ingredients, the said compositions being of distinctive nutritional value as well as adapted to afford enhanced biological effects, and manifesting unusual stability with respect to their unsaturation along with resistance to oxidative degradation.

A further object relates to orally ingestible nutritional compositions embodying a high content of chemically unsaturated ingredients, and containing one or more components of definite nutritional value as ingestants while affording a pronounced stabilizing function with respect to unsaturation and resistance to oxidative degradation, the said compositions being capable of manifesting desirable therapeutic and/or physiological effects in dosages within the limits of permissible tolerance.

An important object is the obtention of markedly stable improved animal feed supplements embracing a high content of chemically unsaturated components appropriately coordinated with ingredients which combinatively manifest a distinct enhancement in the physical development and/or well-being of the animal.

A significant object of the invention comprises stabilizing or antioxidant compositions of particular effectiveness relative to edible products high in chemically unsaturated ingredients, such as various animal oils, vegetable oils, fats and the like, the said stabilizing or antioxidant compositions being per se adapted for and of value as oral ingestants and capable of distinctly contributing to biological development.

Still another object is directed to methods for preparing compositions of the aforesaid types, pertinent both to the nutritional products capable of affording enhanced biological effects and to the stabilizing or antioxidant compositions as contemplated herein.

Other objects, features and advantages of the invention will be apparent from the descriptive details as set forth hereinbelow.

The products or compositions within the purview of the present invention are subject to diversified adaptation as above indicated. However to facilitate a consideration of the factors and attributes herein, the following details are in substantial measure directed to an optimum embodiment of the invention which comprises the adaptation of such novel compositions in the category of animal feed supplements. It will nevertheless be clear that this course is resorted to merely by way of illustration, without any intent to thereby be limitative of the scope of the invention.

As above indicated, the edible fatty or oleaginous materials within contemplation contain a substantial content of unsaturated components or compounds, otherwise referred to as "unsaturates," and in their preferred as well as optimum adaptations embracing a considerable proportion of multibonded components, also designated herein by the term "polyunsaturates." These materials may be of synthetic or natural derivation and in either a crude or refined state.

The oleaginous substances of primary desirability are the edible oils of animal or vegetable derivation, which are essentially glycerides of fatty acids embracing substantial amounts of unsaturates, comprising fatty acid moieties which in a significant extent are multibonded. Moreover free fatty acids may likewise be present either inherently or as a result of the processing of the oils, as in connection with any refining treatment applicable thereto.

In fundamental essence, the product aspects of the invention include the following ingredients:

(a) An oleaginous substance, such as a vegetable oil, animal oil, or mixtures thereof, which are inherently rich in unsaturates, embracing a high content of polyunsaturates. Among the preferred types of such oils are wheat germ oil, soya oil, corn oil, sesame oil, safflower oil, peanut oil, as well as various fish oils, exemplified by the cod and menhaden types.

(b) An additive of phosphatides, substantially in excess of that which may be present in any of the aforesaid types of oils. A primary and optimum embodiment comprises the monamino-monophosphatide, lecithin.

(c) An additive of a chromanol type compound or mixtures thereof, in its primary embodiments comprising a tocopherol and preferably mixed tocopherols embracing the alpha and gamma types, although other types of tocopherols, such as the beta and delta may likewise be included. Illustrative of quite satisfactory mixed tocopherols is the Eastman or Distillation Products Co. type 4–50. Particularly as a result of the alpha tocopherol in this additive, a high vitamin E content is afforded to the product.

(d) The relative proportions of the additive lecithin and tocopherols may be subject to considerable variation insofar as pertains to nutritive values afforded by the composition simultaneously embodying both of these components. While these ingredients are present in substantial amounts relative to their normal occurrence, if any, in the oleaginous substance comprising the unsaturates (including the desirable polyunsaturated acid containing oils), their respective quantities may nevertheless be quite small in terms of the complete composition, but desirably at least approximately 0.2% additive tocopherols and a minimum of about 2% additive lecithin. Thus the content of additive lecithin is substantially in excess of the additive tocopherols.

(e) Perfecting ingredients may likewise be desirably included in the product or composition. Indicative of such perfecting ingredients are additional types of vitamins as A and D, brain as well as liver lipids, and antioxidants utilized with respect to the method of producing the products or compositions of the invention. While the amounts of these substances are extremely small relevant to the principal components, they nevertheless manifest combinative effects, as differentiated from their normal functions per se, in enhancing the characteristics of the product or composition.

The broad aspects of the composition comprising a vegetable or animal oil having material content of unsaturates and containing substantial amounts of additive lecithin as well as tocopherols per se afford features of novelty with respect to various usages, and particularly as an animal feed supplement. Without intending to be restricted in terms of any theory or explanation, the combinative functions of the comparatively high vitamin E content afforded by the tocopherols, as well as the other characteristics of the tocopherols, together with the additive lecithin and the unsaturates present in the oil composition seemingly afford an improvement in the metabolism of ingredients of the composition with an attendant enhanced biological functioning.

However in order to attain the optimum inventive attributes of the invention, including the critical aspects thereof, it has been found that the essential ingredients comprising the novel compositions must be coordinated in appropriate proportions for effecting a combinative product. Thus a further consideration of the aforesaid ingredients as referred to at (a), (b), (c), (d) and (e) above is noted herewith:

(a) The edible oil containing unsaturates as aforesaid, desirably of natural derivation, comprises the preponderance of the composition, and in effect may be designated as the base thereof. Illustrative of the unsaturates content, expressed in terms of the fatty acid moiety, of oils in the category of those utilized herein is the following tabulation:

|  | Corn | Soy Bean | Wheat Germ |
| --- | --- | --- | --- |
| I₂ Value | 123–126 | 122–128 | 132 |
| Oleic, percent | 27 | 25 | 24 |
| Linoleic, percent | 55 | 51 | 50 |
| Linolenic, percent | Trace | 7.5 | 7 |

(b) With respect to the added phosphatides, preferably lecithin as above indicated, an optimum amount thereof may be within the range of approximately 6% to 8% by weight of the ultimate composition. In this connection, it will be understood that the range may effectively be approximately 2.5% to about 11%, although the efficacy of the minimal amounts are definitely not comparable with the attributes afforded by the higher or optimal percentages.

(c) As for the tocopherol proportion, determinative of the added vitamin E content and other chromarol type ingredients, this may be in amounts by weight in the approximate range from .25% to 2% of the complete oleaginous composition, a preferred range being 0.35% to 1.5%, with optimum content usually comprising between approximately 0.5% to about 0.6%.

(d) It is additionally essential, from the standpoint of effecting both substantial biological manifestations and enhanced stabilization of the composition that the proportion of added phosphatides, preferably lecithin, to added tocopherol, desirably mixed tocopherols, should be within the aproximate range of 5:1 to 20:1, and optimally in the approximate ratio of 10:1 to 14:1 parts by weight relative to each other, as they occur in the over-all product or composition. By the same token, the combined content of lecithin and tocopherols in the ultimate composition should be within the range of approximately 3% to 15%, an optimum amount being approximately 6% to 8%.

In adhering to the aforesaid approximate proportion range of 5:1 to 20:1 with respect to the lecithin and tocopherols, it will be understood that a given percentage of one of these components will warrant the inclusion of the other in a percentage conforming with a ratio within the aforesaid designated range for attaining the primary attributes of the invention. Moreover in resorting to a minimum or to a maximum of one of these two principal ingredients, the other will usually be embraced in an amount representing an adjusted variation as a compensating expedient, and desirably in the vicinity of an optimal content. Thus the ratio of the lecithin to the tocopherols content may be subject to variation within the said approximate proportion range, and at the same time, it should conform with the herein-designated approximate percentage ranges applicable to these substances in the overall formulation, namely 0.25% to 2% for tocopherol and 2.5% to 11% for lecithin. Likewise where the concentrate type product is within contemplation, while the aforesaid proportion range of 5:1 to 20:1 will similarly pertain thereto, the relevant percentage ranges, as further set forth hereinbelow, will be applicable, namely approximately 2.6% to 12.0% for tocopherol and in the vicinity of 30% to 70% for the lecithin. It should be added that where a minimal amount of one of these components is utilized, the quantity of the other component desirably is more or less approximately optimum, while conforming with the aforesaid proportion range.

(e) As above indicated, the contributive attributes of the perfecting ingredients are obtained by the inclusion of modicums of such substances. Thus a usual characteristic of vitamins is that extremely minor amounts thereof are essential to manifest their effects, and the proportion of vitamins A and D conforms with such an extent of adaptation, pursuant to the practice in the art pertinent to orally ingestible products. Desirably the relative quantities of vitamin A to vitamin D may be 10:1, although there is no restriction to such a ratio. With respect to brain and liver lipids, while equivalent proportions may be utilized, this is also subject to variation as desired. Moreover and notwithstanding the product attributes afforded by the perfecting ingredients, they may be omitted without deviating from the fundamental aspects of the invention. Concerning the antioxidants which may be present, as previously noted, their contemplated function comprises a detail relevant to an expedient preparation of the product, and not as an intended ingredient thereof.

The formulation of compositions within the purview of the present invention results in a difference in kind over any product heretofore contemplated with respect to orally ingestible compositions embracing a high content of unsaturates. Thus despite the potential biological value of edible oils high in chemical unsaturation, such as those of the type indicated hereinabove, including wheat germ oil, soya oil, corn oil, or the like, this has not been possible or practicable of attainment since, as previously indicated, the amounts of such natural oils contemplated to afford the desired effect on animals, for example, has exceeded the permissible tolerance to the extent of resulting in "scours" with attendant fatigue, malaise, and/or failure to reproduce, etc. By contradistinction, products or compositions within the latitude of the preferred or optimum embodiments of the present invention have permitted the administering of appropriate dosages for attaining biological effects, conducive to the development, well-being, and reproduction of animals, without the aforesaid objectionable collateral reactions.

Merely by way of plausible explanation, and without any intent to be restricted in terms of any theory with respect thereto, it is believed that the primary additive components, appropriately formulated, promote the metabolism of the unsaturates to a most substantial extent, likewise materially accentuating the physiological function of the phosphatide content, thereby permitting an ample dosage of the oleaginous composition, considerably greater than heretofore practicable, resulting in an increased intake of polyunsaturates, phosphatides and the like, without the aforesaid ulterior effects. Moreover it should be added that the over-all characteristics of the products as obtained herein, in view of their significantly increased activity, do not require a dosage comparable in amount to that which would be essential on the basis of the oils per se. Additionally indicative of the difference in kind, relevant to the products and compositions, pursuant to the scope of the present invention, are their unusual stability with respect to retention of maximum unsaturation and resistance to deterioration by oxidation or development of rancidity. This will be the subject of further consideration hereinbelow.

As previously suggested herein, the oils comprising the preponderance of the composition may inherently contain phosphatides and tocopherols. However the relative amounts present are negligible and quite incapable of affording the desired combinative association with each other as well as with the other ingredients of the product, pursuant to the features of the present invention.

The characteristics of the compositions contemplated by the invention will be further apparent in view of the following optimum embodiments thereof. In order to effectively present these embodiments, the steps or phases involved in their formulation, which determine their preferred methods of preparation, are at the same time indicated.

FORMULATION I

A. Concentrate product (approximately 53.5 lbs.):

Step 1

Dissolve 18.5 g. of 2,6-di-tert-butyl-4-methyl-phenol (such as Ionol USP of Shell Chemical Corp.) in 10 lbs. of wheat germ oil. Heat until dissolved, at 65° C.–70° C. for about 10–12 minutes, stirring continuously.

Add 28.25 lbs. refined lecithin.

Heat slowly to the optimum temperature of 85° C., maintaining the same for approximately 5 minutes while stirring and then cool slowly. The critical temperature range which is applicable to this heating comprises approximately 80° C.– 90° C.

Step 2

In a separate container, mix 18.5 grams of powdered propyl gallate and 18.5 grams of propylene glycol. Heat getnly, stirring until the propyl gallate is fully dissolved, the solution revealing a tawny port wine color.

Step 3

Separately add 1.5 lbs. each of brain and liver lipids to 10 lbs. of wheat germ oil. Heat to 85° C., with continuous agitation, maintaining the temperature for 5–10 minutes. The temperature may be in the aforesaid range of 80° C.–90° C., 85° C. being optimal.

During slow agitation, mix the resultant solutions of step 1, step 2 and step 3, preferably in that order.

Step 4

To the combinative solution of steps 1, 2 and 3, add 1 kilo of mixed tocopherols (such as type 4–50 Eastman or the like).

Then add 19.25 cc. of a mixed vitamin A and D, (Myvax of Distillation Products Co. being satisfactory).

The over-all mixture is re-heated to the optimum temperature of 85° C. for five minutes, cooled and, if desired, filtered to remove particulate brain and liver solids, although this latter expedient is not necessary. As designated above, the temperature utilized in this critical heat treatment may be within the approximate range of 80° C.–90° C.

B. The final composition (approximately 413.5 lbs.):

To 260 lbs. of soy bean oil (or other oil to be utilized) add the 53.5 lbs. of the concentrate product of A. During continuous agitation, add to the latter solution 100 lbs. of wheat germ oil (preferably containing 2 international units of vitamin E and having zero peroxide value).

Again desirably raise the temperature of the ultimate mixture to 85° C., terminate the heating, and cool under atmospheric conditions with stirring for approximately 10 minutes.

In further reference to the combinative aspects of the ingredients as they are coordinated in step 1 of this formulation, the phenol component is a commercially available antioxidant, and it is initially admixed with the designated quantity of wheat germ oil, a relatively small proportion of that in the ultimate composition, for the purpose of effecting an initial stabilization during the preliminary stages of preparing the product, especially in view of the attendant heat treatment of the said wheat germ oil in the temperature range of 80° C.–90° C. Thus the designated phenol is intended to afford a protective function with respect to the possibility of oxidative effects on the oil during the applicable heating, and may likewise comprise a stabilizer with respect to any oxidation of the lecithin which is likewise supplied in this initial step. Differently stated, while lecithin may function as a desirable stabilizer of the unsaturation embodied by the oil, it is per se ineffective as an antioxidant within the purport of the invention, a relevant indication thereof being presented hereinbelow.

It will be understood that neither the aforesaid explanation concerning the initial antioxidant purport of the phenol nor any theory which may be involved with respect to the mechanism of its function is intended to be in any manner restrictive of the invention. The same pertains to the following consideration of the characteristics manifested by the other components, ingredients or reagents utilized.

The glycol solution of propyl gallate, contemplated by step 2, is likewise pertinent to inhibiting any decomposition of the reagents or substances involved during the formulative stages of the product, and in effect supplements the function of the phenol compound of step 1. Thus the phenol and the gallate ester are submitted to be in the category of protective inhibitors, primarily relevant to the phases or steps in the optimum preparation of the so-called concentrate product A, as distinguished from essential components of the said product or the ultimate composition.

Concerning the brain and liver lipids of step 3, these substances are recognized sources of lecithin, thereby supplementing the content of this component in the composition. Moreover they supply additive highly unsaturated fatty acid substances, such as the cephalins and sphingomyelins, as well as introducing other desirable phosphatides enhancing the biological activity and stabilized properties of the product.

Relative to step 4, the mixed tocopherols provide a requisite high vitamin E content as well as other factors of stabilizing and biological import, especially in combination with the lecithin in the over-all compositions. In addition thereto, mixed vitamins A and D are desirably added, and as aforesaid, while said vitamins A and D further contribute to the combinative essence of the invention, they are nevertheless in the category of perfecting additives.

The composition resulting from steps 1 and 4 inclusive produces the concentrate product A, which per se comprises a significant aspect of the invention. There is a definite implication that an interaction is effected, at least between some of the components involved, by the heat treatment in the aforesaid critical approximate temperature range of 80° C. to 90° C., and particularly at the optimum temperature of 85° C. Thus the results are suggestive of a complex product formation, which may be a lecithin-tocopherol type of compound or a lecithin-tocopherol-unsaturated fatty acid complex, further referred to hereinbelow.

In this connection, it is noteworthy that the lecithin content of concentrate product A is substantially in excess of the tocopherols present therein, the former comprising between 52%–53% (computed as 52.6%), and the latter approximately 4%–5% (computed 4.1%). While the precise weight ratio of lecithin to tocopherol in concentrate A is approximately 12.8:1, the aforesaid optimal ranges of 52%–53% and 4%–5% indicate an optimal lecithin to tocopherol ratio range of 10:1 to 14:1. As previously stated, the effective attributes of the invention are afforded in varying extent by the proportionate additive weight range of lecithin to tocopherols between 5:1 and 20:1. Of pertinent interest, the added tocopherol available for effective complex formation, minimally about 2.6% of the concentrate product A, is at this minimal amount believed to be in the order of 350 times as much as that which naturally occurs in the oil present in concentrate A.

Accordingly the combined content of lecithin and tocopherols in the aforesaid embodiment of concentrate A is between 56% and 58%, a desirable optimal range being approximately 55% to 60%. However an over-all optimal range, as indicated further hereinbelow, comprises approximately 55% to 75% as the cumulative amounts of the said primary components of the concentrate product. Moreover while a combined minimum of about 25% affords improved results, the latitude for attaining effective practicable attributes of the invention embraces the approximate range of 35% to as much as 80%. It will be understood that the aforesaid ratio of 5:1 to 20:1 is applicable to the lecithin and tocopherol, irrespective of the content or range involved.

It will be apparent that the concentrate product is per se adapted for oral ingestion, capable of affording biological advantages pursuant to the invention. This is evident from the content of unsaturates in the wheat germ oil vehicle, the nutrient as well as tonicity and other physiological values of the substantial lecithin content, together with the comparatively large amount of tocopherols affording vitamin E in this product. The attributes of the aforesaid complex product, believed to promote the metabolism of the unsaturates and lecithin absorption, are similarly afforded.

However the concentration of the desirable components obtainable from the concentrate product is generally unnecessary for attaining the requisite effects. Differently stated, the inclusion of the concentrate as an essential ingredient of an edible oil embodying a high content of desirable polyunsaturates will usually afford comparable or even improved results, due to the cumulative amounts of the unsaturates which are thereby provided.

In consummating Formulation I, the concentrate product A is admixed with a contemplated edible oil high in unsaturate values, which is designated in B as being of soy bean derivation in substantial preponderance, with a lyarge quantity of vitamin E-containing wheat germ oil also included. The resultant composition is optimally heated to approximately 85° C., or within the temperature range of 80° C.–90° C. for 5 to 10 minutes, at which point the heat is removed and the composition is allowed to cool atmospherically with continuous agitation.

By way of collateral pertinency, a reasonably satisfactory formulated composition is attainable through combining the Concentrate A and the contemplated oil or mixture of oils, without resort to heating of the ultimate composition. Thus enhanced metabolic effects attributable to the unsaturates of the oils, supplied at the terminal stage of the formulation, may be afforded, notwithstanding the omission of any heating involved in the admixture of the concentrate therewith, although optimum results are not thereby attained.

It is of interest to note at this point that the content of lecithin embodied in this formulation is optimally between 6% and 7% (computed 6.83%), while the optimal range of added tocopherols therein comprises about 0.5% to 0.6% (computed 0.53%), and the combined proportion by weight of these two constituents is approximately 6.5% to 7.5% (computed 7.36%). On the basis of the aforesaid ranges of 6%–7% and 0.5%–0.6%, the ratio range of lecithin to tocopherol comprises 10:1 to 14:1. As previously noted, the range of lecithin may effectively be 2.5% to 11% by weight in the ultimate formulation, with the range of tocopherols embracing approximately 0.25% to 2%, although a minimum of at least 0.35% is desirable for optimal results, a pertinent range being 0.35% to approximately 1.5%. Similarly the combined content of lecithin and tocopherol is within the approximate range of 3% to 15%. By the same token, the relative weight ratios applicable to the additive lecithin and tocopherols will in essence conform with the indication presented in the above discussion of the concentrate product A, namely in the approximate range of 5:1 to 20:1, an optimal ratio being 10:1 to 14:1 as further indicated hereinbelow.

Notwithstanding the substantially lesser proportionate content of the phosphatides and chromanol type substances, primarily the tocopherols, in the over-all composition or formulation, as compared with the concentrate type of product the enhanced biological and therapeutic values afforded by such composition are, as aforesaid, generally greater than that provided by the concentrate per se. However, the improved effects of the composition are attributed in considerable measure to the said concentrate type product, apart from the combinative function of some of the components involved.

Thus the concentrate, such as product A, is seemingly a distinct factor in permitting the administration of permissible tolerance dosages of the oleaginous formulation, which may be considerably in excess of that heretofore possible, but actually reducing the extent of dosage essential to afford the contemplated biological effects. In essence, the said concentrate substantially enhances the metabolism of the unsaturates in the edible oils utilized, thereby permitting the utilization of greater, normal, or even lesser extent of dosages, at the same time attaining a more effective functioning thereof in the animal system. In addition, there is some indication that the said concentrate provides an increased activity and effectiveness of the biological or physiological characteristics attributed to phosphatides, generally conceded to manifest a bearing on the reproductive and related functions apart from their therapeutic values.

As for the vitamin A and D which may desirably be embraced by the composition, desirably in the ratio of 10:1 although subject to variation, these tend to supplement the metabolizing of the unsaturates, including the particularly desirable polyunsaturates in the product. Differently stated, these vitamins accentuate the effectiveness of absorption of the unsaturates as well as the activity of the phosphatides, primarily attributable to the A concentrate product.

By way of reiteration, while the foregoing consideration is believed to be applicable to the characteristics and functions of the components determining the final product it is presented by way of plausible explanation without any intent of being restricted thereto or in terms of theoretical aspects that may be involved. In any event, the characteristics and functions of the ultimate composition afford entirely unforeseen attributes that are definitely unattainable in the adaptation of the oils per se, and the following is indicative of the desirably high unsaturation characteristics of the optimum product comprising Formulation I:

|  | Percent |
|---|---|
| Oleic acid | 21.13 |
| Linoleic acid | 49.91 |
| Linolenic acid | 4.59 |
| Cephalin acids | 3.90 |
| Arachidonic acids | 0.161 |
| Other unsaturated acids | 0.118 |

Another product likewise comprising an optimum embodiment of the invention is indicated by the formulation presented next hereinbelow. The purport thereof emphasizes that the vegetable oil or mixture of oils, comprising a primary source of the unsaturates in the composition, varies from that of Formulation I, and also illustrates that the desirable lipids of the latter product are in the category of perfecting ingredients which may be supplied at a different stage in preparing the composition.

FORMULATION II

A'. Concentrate product (approximately 40.5 lbs.):

Step 1

Admix 18.5 g. of 2,6-di-tert-butyl-4-methylphenol (such as Ionol) in 10 lbs. of corn oil. Heat until dissolved at 65° C.–70° C. for 10–12 minutes, stirring continuously.

Add 28.25 lbs. refined lecithin.

Heat slowly to the optimum temperature of 85° C., maintaining the same for approximately 5 minutes, while stirring continuously. Then cool slowly, desirably under atmospheric conditions, or in any expedient manner. Note applicable temperature range is approximately 80° C.–90° C.

Step 2

In a separate container mix 18.5 g. powdered propyl gallate and 18.5 g. of propylene glycol. Heat gently, stirring until the propyl gallate is fully dissolved, the solution having a tawny port wine color.

Step 3

During slow agitation, mix the resultant solutions of step 1 and step 2.

Step 4

To the combinative solution of steps 1 and 2, add 1 kilo of mixed tocopherols (such as type 4–50 Eastman).

Then add 19.25 cc. of a mixed vitamin A and D (as Myvax).

The over-all mixture is slowly re-heated to 85° C. for 5 minutes, then cooled in any expedient manner or merely under prevailing atmospheric conditions. The critical temperature range which pertains is 80° C.–90° C.

B': The final composition (approximately 403.5 lbs.):

To 220 lbs. of soy bean oil, add 40 lbs. of corn oil. The admixture of these two oils is then supplied with the above prepared 40.5 lbs. of concentrate A'. In addition, 1.5 lbs. each of brain and liver lipids are included. While these may be supplied in any desirable proportion, preferably equivalent amounts are added.

During constant agitation of the foregoing ingredients, there are admixed therewith 100 lbs. of wheat germ oil, and the temperature of the over-all composition is preferably increased to the aforesaid temperature of 85° C. for optimum results. The heat is then terminated, and the composition is cooled, desirably at atmospheric conditions, with continuous agitation.

As aforesaid, the critical temperature range of 80° C.–90° C. is applicable. If desired, particulate matter may then be removed by filtering.

As indicated with respect to stage B of Formulation I, a desirable composition may likewise be attained by stage B' without resort to the heat treatment. Thus the admixture of concentrate A' with the ingredients designated in the B' stage may afford contemplated attributes, although an optimum composition may result from a final heat treatment within the range of 80° C.–90° C.

Accordingly it will be apparent that the ultimate product of Formulation II comprises in preponderance an admixture of corn oil with soy bean oil, and the liver as well as brain lipids are supplied during the latter stages of preparing the product, as an additive thereto, this being distinguished from the inclusion of such components as ingredients of the concentrate product. Further distinctions between the concentrates of Formulations I and II, respectively, are indicated by corn oil comprising the vehicle or base of the present concentrate product A', as differentiated from wheat germ oil contemplated in this connection by step 1 of Formulation I. Moreover as evidenced by B' of Formulation II, this composition is predicated upon the inclusion of 220 lbs. of soy bean oil mixed with 40 lbs. of corn oil, also embracing 100 lbs. of wheat germ oil, while stage B in Formulation I involves 260 lbs. of soy bean oil and 100 lbs. of wheat germ oil, omitting the corn oil.

As previously indicated, the attributes of Formulation II are generally comparable, in the enhanced effects which it affords as a feed supplement as well as in its other adaptations, with the product of Formulation I. Thus any differences are primarily due to variations in the vitaminic content and to the types as well as amounts of unsaturates embodied by the oils comprising the preponderant ingredients of the respective compositions.

Concerning the content of the principal components of Formulation II, it will be noted that lecithin comprises 7.00% thereof and tocopherols are present to the extent of 0.5% to 0.6% (computed 0.55%), the ratio of lecithin to tocopherol being between 11:1 and 14:1 on the basis of the said tocopherol range. The conjoint amount of these two ingredients in the formulation is 7.5% to 7.6%, or in round terms approximately 7% to 8%.

Thus the lecithin and tocopherol contents of Formulations I and II are substantially similar in considerable measure. With Formulation I embodying 6%–7% lecithin and 0.5%–0.6% tocopherol, their combined amounts are represented by the range of 6.5%–7.6%. Thus the conjoint proportion of lecithin and tocopherol suggested by both Formulations I and II is the approximate range of 6% to 8%, the optimal ratio of these components being in the approximate range of 10:1 to 14:1.

From the standpoint of the concentrate product A′, the proportion of lecithin therein is 69% to 70% (computed 69.75%), and the tocopherol comprises 5% to 6% (computed 5.43%). As designated hereinabove and by way of comparison, the lecithin is present in concentrate A within the range of 52%–53%, the tocopherol content being approximately 4%–5%, while the combined percentage of these ingredients comprises the range of 56% to 58%. Accordingly the optimal ranges designated on the basis of both concentrate A′ as well as concentrate A are approximately 50% to 70% lecithin and 4% to 6% tocopherol, and the combined content of lecithin and tocopherol, embraced by both of the aforesaid concentrates A and A′ is within the range of approximately 55% to 75%. It should be added that the ratio of lecithin to tocopherol is comparable with that which pertains in the complete Formulations I and II.

The above consideration of Formulations I and II as well as the concentrates A and A′ affords an indication of optimal ranges of lecithin and tocopherol in the products or compositions of the invention. However it will be understood that these ranges are not limitative of the optimal latitudes of the designated components which may be utilized, since as hereinabove indicated, wider optimal ranges are definitely within the purview of the invention, likewise a broader scope of the lecithin and tocopherol may be practicable as well as effective for attaining a contemplated function.

This is illustrated by effective ranges in the concentrate type of products comprising approximately 30% to 70% for the lecithin content and 2.6% to 14% with respect to the amount of tocopherol. Likewise relevant to the combined content of lecithin and tocopherol in the concentrate, a desirable scope for attaining the contemplated results is within the range of 35% to 80%.

As previously stated, the so-called commercial type antioxidants utilized in the production of the products are primarily perfecting ingredients, as distinguished from fundamentally essential components. Thus effective products may be produced, without the inclusion of such antioxidants. However as previously indicated, the resort to these ingredients contributes to optimum conditions of procedure and the obtention of optimal products or compositions.

It will be apparent that the preparation of the compositions in accordance with the procedure set forth in attaining the optimum illustrative embodiments of the invention is of distinctive significance. Thus the process described is predicated upon the utilization of the designated types of ingredients or reagents in an appropriate sequence, with the fundamental components being present within the approximate ranges designated herein. Moreover the conditions of formulation are of importance, particularly from the standpoint of the critical temperature range adapted to associate or combine the components in a manner which will afford optimum characteristics to and functioning of the product.

Thus in referring to the process of Formulation I with respect to preparing the concentrate A, step 1, relates to admixing a base vehicle, such as a vegetable or animal oil having a high content of unsaturates, with a commercial antioxidant, and facilitating the solution of the latter in the vehicle, as by heating and agitation. There is added to this solution a substantial proportion of lecithin, followed by heating to appropriately embody the lecithin in the aforesaid base oil vehicle, the temperature being adapted to avoid any adverse effect on the lecithin content.

Pursuant to step 2 of Formulation I, a gallate ester type of antioxidant is dissolved, by resort to heating in an alkylene glycol, such as propylene glycol. If desired, brain and liver lipids may separately be coordinated with an oil within the sphere of the above-designated oleaginous base vehicle, and while the inclusion of such additives affords highly desirable ingredients, they are not essential to the fundamental aspects in the preparation of the concentrate product, or they may be introduced at a different stage of the process as described in connection with the preparation of Formulation II.

The components of step 1, which include the lecithin, are then admixed with the antioxidant solution of step 2, also embodying the brain and liver lipids, if their presence in the concentrate is desired, a accordance with step 3. To the resultant composition, as indicated by step 4, a substantial proportion of mixed tocopherols is added, and perfecting vitamins, desirably vitamins A and D, may similarly be supplied at this stage. The overall mixture is then subjected to a heat treatment for approximately 5 minutes within the critical temperature range of 80° C.–90° C., 85° C. being optimal in this connection, the purport thereof having been referred to above and is the subject of further consideration hereinbelow. The composition thereby prepared comprises the aforesaid concentrate product A.

The method of preparing the ultimate or final composition supplements the aforesaid sequence of steps and procedural conditions by admixing the concentrate product with a preponderance of the contemplated vegetable or animal oil, or mixture of such oils, comprising the source of desired unsaturated fatty acids. The composition is optimally effectuated by stirring the mixture while heating to a temperature within the aforesaid range of 80° C.–90° C., and preferably at approximately 85° C., for approximately 10 minutes, during continuous agitation.

However as stated above in connection with the consummating of Formulation I, this latter heat treatment is not an unqualified requisite, since quite satisfactory compositions are afforded by the coordination of concentrate product A with the desired oils, pursuant to B, without heating, although the resort to heat normally affords an optimum composition.

The process applicable to concentrate product A′ of Formulation II to all intents and purposes conforms with the foregoing details applicable to Formulation I. However in the general adaptation of the procedural features of the invention, it will be understood that variations may be made at the respective stages or steps in preparing the said concentrate product A′ or the ultimate composition embracing the same, such as with regard to the manner of attaining the contemplated solutions, the commercial stabilizing agents initially utilized, and the stage at which the additives or perfecting agents are included. This latter detail is indicated by Formulation II, which as aforesaid, supplies the brain and liver lipids as an additive to the final product, and is thereby differentiated from the inclusion of these substances in the preparation of the concentrate, as in Formulation I.

Indicative of biological effects afforded by compositions within the purview of the invention, the utilization thereof as a feed supplement for poultry is illustrated by the following tabulation:

| Groups | Avge. Terminal wt. Before Sacrifice, lbs. | Amt. Grain Consumed per lb. Poultry Produced, lbs. | Percent Savings of Feed |
|---|---|---|---|
| 3 (200 birds) | 3.385 | 2.998 | Control |
| 1 (100 birds) | 3.45 | 2.706 | 9.8 |
| 2 (300 birds) | 3.483 | 2.653 | 11.5 |
| 4 (400 birds) | 3.40 | 2.600 | 13.3 |

The groups of poultry comprising the aforesaid pens 1, 2, 3 and 4, were retained in the same house or building, adjacent each other, but appropriately separated by chicken wire which prevented any possibility of interchange of the respective groups, although they were all subject to precisely the same atmospheric conditions. Moreover all the chicks were subject to the same procedural details of feeding, the distinctions being restricted to the feed and/or the drinking water embodying the composition of Formulation I. Additionally noteworthy, the tests contemplated by the respective pens commenced with chicks that were one day old.

Pen 3 comprised the control group, and was supplied merely with a standard commercial poultry feed and pure drinking water. With respect to pen 1, the same poultry feed was provided as in pen 3, but the drinking fluid comprised a 1% aqueous emulsion of Formulation I, constantly available during the ten week test, conforming with the life of the birds.

As for pen 2, the chicks of this group received pure drinking water throughout their life span. Moreover during the initial five weeks, the chicks of this pen were supplied with the aforesaid standard commercial poultry feed, embodying 1% by weight of Formulation I.

Concerning pen 4, the feed was restricted to the aforesaid commercial type likewise containing 1% by weight of Formulation I. The liquid administered to the chicks of this pen was pure drinking water. Thus the chicks of the present group were recipients of the fortified feed during their entire ten weeks of life, as distinguished from the five week interval in which the birds of pen 2 were administered the same fortified feed.

In all of the tests of pen 1, pen 2 and pen 4, the average weight of the poultry, as compared with the control pen 3, resulted in the achievement of the desired commercial weight. Of distinct importance is the curtailment in the feed consumed per pound of poultry. Thus the attendant savings in feed utilized is shown to be quite substantial, ranging between 9.8% for pen 1, 11.5% for pen 2 and 13.3% for pen 4, representing an average in excess of 11%. Particularly noteworthy is the indication of the pen 2 test that administering of the feed supplement is not essential for the entire interval of poultry life, and an effective comparable advantage is afforded by merely supplying the supplement during the latter 50% of the poultry existence prior to the sacrifice thereof. Moreover other distinctive advantages were manifested, comprising an improved soundness of the bird and a quite significant reduction in the mortality rate.

In connection with the foregoing, as well as the following consideration, the reference to "animal feed" is intended to embrace any liquid or solid non-toxic ingestible substance which is supplied to animals for nutrient purposes. By the same token, the intent is to include drinking water within the generic latitude of the quoted terminology.

The following details provide a summary of the diversified biological activities and advantages which have been afforded by supplying the formulations of the present invention, either as a feed supplement or as independent dosages, to the various types of creatures designated:

Group I. Poultry and feathered animals:
 (1) Striking decrease in cannibalism.
 (2) Achievement of the sale weight of the animal, frequently in shorter time, with a distinct savings in feed.
 (3) Decrease in mortality rate.
 (4) Improved quality, confirmation and finish of the meat.
 (5) Healthier plumage and reduction in the incidence of dermatological problems.
 (6) In laying hens, larger eggs having stronger shells and better flavor, with the older hens showing an increase in their laying production.
Group II. Fur-bearing animals (cats, dogs, minks, chinchillas, etc.):
 (1) Strikingly improved over-all health.
 (2) Improved disposition of the animals with decrease in tendency to be vicious.
 (3) Re-establishment of the pregnancy potential in older females.
 (4) In minks, a substantial increase in percentage and size of the kits.
 (5) Increase in lactation.
 (6) Mortality at birth considerably decreased.
 (7) Food savings increased up to 15% in some instances.
 (8) Striking improvement in the density, quality, and luster of the pelts. For example, this has resulted in many instances of substantially increased value of the pelts at the time of marketing.
 (9) Virtual curtailment of grey droppings.
 (10) Substantial elimination of dermatological disorders.
Group III. Larger animals including horses, cows and goats:
 (1) Impressive improvement in general well-being, soundness and fat disposition.
 (2) With respect to cows and goats, increased lactation.

Illustrative dosages for various types of animals are indicated by the following.

Fur-bearing animals:
 A. Peltry types, for example mink, fox and chinchilla—3 ounces per day per 100 animals.
 B. Pets—Cats ¼ teaspoon per day.
  Dogs ¼ teaspoon to 1 teaspoon per day, according to weight.
  Others similar to dosage for dogs.
 C. Large animals, as horses, cows, goats—1% of dry feed weight per day.
Feather-bearing animals:
 A. Edible fowl, including for example, chickens, ducks, turkeys, partridge, cornish hens, etc.—1% of dry feed weight per day or equivalent aqueous emulsion.
 B. Pet and show birds, for example parakeets, canaries, and the like—1% of dry feed weight per day or equivalent aqueous emulsion.

The dosages designated hereinabove have been found to generally afford optimum results. Nevertheless it will be understood that these are primarily illustrative, and may be subject to substantial variation within the skill of one versed in the art of administering such compositions, including breeders, veterinarians and the like.

There have also been convincing indications concerning the value of formulations, within the latitude of the present consideration, as a dietary supplement or as independent dosages for humans. Thus the combinative association of unsaturated fatty acids, or their derivatives as indicated above, and including particularly the polyunsaturated type compounds, together with a high vitaminic content, appropriately coordinated pursuant to the invention, manifest distinctive nutritional benefits as well as pharmaceutical and therapeutic attributes. By way of a summary reference to such adaptations, the implications of salutary effects have been noted in connection with:

(1) The treatment of dermatologic conditions, including those in the eczematous and allergic category, as well as certain disorders resulting in hair loss.
 (2) Cosmetic applications, embracing facial creams, soaps, lotions, shampoos, and the like.
 (3) Cardiovascular problems, such as atherosclerosis.
 (4) Reaction of cholesterol-lipid, lipoprotein metabolism.

In brief, these compositions are of definite therapeutic value in the treatment of humans with respect to various afflictions. It should be added that the formulation utilized from the standpoint of the lecithin and tocopherol contents, as well as the oleaginous material comprising the source of unsaturates, or the dosages contemplated will be subject to determination by one versed in the art, such as a dermatologist or physician.

A quite remarkable property of the products or compositions within the scope of the invention comprises their unusual stability relative to avoiding variation in the attendant unsaturation and resisting oxidative changes or rancidity. In order to emphasize this characteristic, a test standard has been relied upon of heating pertinent samples in the presence of air at 100° C. for a minimum of 500 hours, unless there is prior evidence of obvious variations or decomposition. This procedure encompasses a time factor far in excess of that used to test oils in accordance with the method of Riemenschneider et al. (J. Am. Oil Chem. Soc., 21, 47, 1944), which is the standard test in the industry. With respect to the products of the present invention, such rigid test has resulted in substantially no alteration, either from the standpoint of unsaturation or deterioration by oxidation. This unusual stability greatly exceeds that of any known vegetable and/or animal oils or compositions comprising the same.

The conventional expedient for designating the unsaturation of a substance is in terms of the so-called iodine number. Thus a decrease in the said number reveals a loss of unsaturation. Similarly oxidative variations may be indicated on the basis of the peroxide number, increases in such number revealing that oxidation is taking place, frequently with attendant decomposition.

The following tabulation is indicative of the stability of products of the invention, despite the heat treatment at 100° C. for 500 hours, and the comparable effect of such severe test applied to the unsaturated oils per se, or to deviations in the fundamental ingredients of the product herein:

| Test No. | Composition Tested | Iodine No. Before Test | Peroxide Value Before Test | Iodine No. After Test | Peroxide Value After Test (mg. active oxygen per kilo) |
|---|---|---|---|---|---|
| 1 | Plain soya oil | 120 | | 75 | |
| 2 | In effect soya oil plus approximately 10% Concentrate A', prepared as Formulation II. | 109 | Neary zero. | 107 | Nearly zero. |
| 3 | Same as 2, but tocopherols omitted from Concentrate. | 119 | 13 | 117 | 120 |
| 4 | Same as 2, but lecithin omitted from Concentrate. | 126 | | 57 | gel. |
| 5 | Same as 2, but no critical temperature within range of 80° C.-90° C., such as optimal critical temperature of 85° C., is used in preparation of Concentrate A'. Maximum temperature in preparation was 40° C. | 123 | 65 | 122 | 156 |

SUMMARY RESULTS OF ABOVE TESTS

*Test 1.*—37.5% loss in iodine number indicates serious breakdown of unsaturated acids.
*Test 2.*—Essentially no damage to unsaturated acids and no rise in active oxygen level. Composition remains stable.
*Test 3.*—Essentially no breakdown of unsaturated acids, but sharp rise in active oxygen—indicates some components are evolving oxygen and breaking down, hence rancidity is initiated.
*Test 4.*—Over 50% loss of iodine number—indicates breakdown of unsaturated acids. Gel formed at 500 hours, and thus no peroxide value available.
*Test 5.*—Indication that rancidity originated after preparation and rose sharply during test. However, unsaturated acids not affected.

The significance of the above tabulation, evidencing the characteristics of the various designated compositions subjected to the stated test conditions, is noteworthy. Thus soya bean oil per se, as shown by test 1, revealed a substantial decrease in its unsaturation, due to the heat treatment thereof at 100° C. for 500 hours. No data was taken during this test with respect to deviation of the peroxide number attributable to the applicable heating.

By way of contradistinction, test 2, pertaining to the heat treatment of the ultimate composition containing approximately 10% of concentrate A', thereby corresponding with the above-detailed optimum embodiment of Formulation II, indicated remarkable stability, notwithstanding that the duration of the test was for 500 hours at 100° C., as above stated. The initial iodine number of the inventive product herein was 109, and subsequent to the relevant test, the said number was found to be 107, the variation being to all intents and purposes negligible. At the same time, the peroxide value of the product initially was approximately zero, and at the termination of the test, essentially no change therein was indicated.

On the other hand, deviating from the inventive product of test 2, test 3 omitted additive tocopherols, otherwise embracing about 10% of a product containing the same amount of the ingredients of concentrate A' exclusive of the tocopherol content, and the attendant effect is of distinct interest. The iodine number at the commencement of test 3 was 119, while at the termination of the test the comparable figure was 117, and accordingly substantially no deviation in the unsaturation of the composition resulted from the relevant heat treatment. In contravention thereto, while the initial peroxide value for this composition was 13, at the conclusion of the test the peroxide number had risen to 120, clearly suggesting a material oxidative degradation. Although not intending to be restricted to any theory or explanation, this test reveals per se lecithin as an effective stabilizing ingredient insofar as pertains to the unsaturation characteristics of the designated vegetable oil composition, but it does not prevent oxidation thereof under the stringent test conditions applied.

Concerning test 4, this pertains to a composition conforming in its ingredients with that of test 2, except for the omission therefrom of the additive lecithin pertinent to the concentrate product. Thus approximately 10% of a product containing the same amounts of the ingredients of concentrate A', exclusive of lecithin, was utilized. By way of comparison with test 3, the said test 4 varied therefrom in that the latter included added tocopherols in preparing the concentrate product, but not the lecithin. The result of a 100° C. temperature applied to the product of said test 4 for 500 hours is believed to warrant the deduction that a substantial variation transpired therein, as evidenced by its change to a gel state. In this connection, the iodine number which initially was 126, decreased to 57, indicating a substantial loss in unsaturation, and providing further evidence of the role of the lecithin-containing concentrate product herein with respect to the prevention of breakdown in the unsaturated fatty acids of the vegetable oils utilized.

The purport of test 5 is directed to the significance of the heat treatment, as applied pursuant to the invention, in the preparation of products or compositions, such as those illustratively presented hereinabove. Thus test 5 pertains to Formulation II, the details of preparation being restricted to the deviation from a critical temperature within the range of 80° C.-90° C. in the production of the concentrate product. By way of reiteration, the range of temperature contemplated by the foregoing products or formulations of the invention, was 80° C.-90° C., with 85° C. being an optimum value for the heat treatment at the steps designated with respect thereto. However, in test 5, the emperaure of 40° C. was resorted to in formulating the concentrate.

The result of relying upon the lower temperature, as in test 5, in preparing the composition including the concentrate product, was that the iodine number manifested essentially no variation after heating at 100° C. for 500 hours, while the peroxide number increased from 65 to 156, representing an oxidative degradation, which in terms of the peroxide value, comprised an extent of approximately 140%. The import of this test emphasizes the critical aspects of temperature in preparing products manifesting the attributes contemplated herein. Thus the aforesaid range of approximately 80° C.–90° C. has been found to afford product characteristics that are not attainable at temperatures either substantially below or above this range. Conecrning temperatures materially in excess of 90° C., it should be added that the effect thereof tends to introduce the hazard of a detrimental action to at least some of the essential componens embodied in the compositions of the present invention, such as the phosphatides and vitamins.

The enhanced properties of the compositions within the latitude of the invention are, as above indicated, attributable to the combinative functioning of the components thereof and/or the synergistic effects manifested by the various ingredients or combinations thereof. Moreover as previously indicated, the concentrate products likewise manifest distinctive synergistic properties from the standpoint of the aforesaid enhancement in the biological or metabolic functioning of the unsaturated acids, including the optimum polyunsaturated acids, of the final composition, apart from the effects thereof in increased activity afforded by the phosphatides. These characteristics are brought into relief by the realization that the oils, high in such unsaturates, that comprise the preponderant ingredient of the composition, will not per se afford any semblance of comparable biological or therapeutic attributes which result when the concentrate product is embodied in such an oleaginous composition to provide the results attainable, pursuant to the invention.

Moreover the aforesaid unusual permanency of the formulations described is also predicated on the concentrate type products herein, which afford antioxidant and stabilizing properties to quite an unusual as well as unforeseen extent, particularly with respect to highly unsaturated substances, such as the various edible animal and vegetable oils, rich in unsaturates comprising fatty acid moieties, which are the preferred embodiments of the preponderant components of the products or compositions described. The oxidation inhibiting and general stabilizing function of the aforesaid concentrate product type substance is more aptly exemplified by the tabulation next hereinbelow. The results of tests 1, 2, 3 and 4 pertain to the oils or fatty substances designated, containing 12.9% of concentrate product A, while tests 6 and 7 contemplate a deviation as indicated in the quantity of the said concentrate. However test 5 utilizes a modified type of concentrate product wherein the combined lecithin and tocopherols have been reduced to comprise approximately 5% of the over-all composition. In this connection, it will be noted that the content of concentrate product A in Formulation I is approximately 12.9%, while Formulation II embraces about 10.0% concentrate product A'.

The unusual antioxidant and stabilizing functions of the concentrate product are accentuated by the aforesaid results, effected under the above-designated rigid test conditions of 500 hours at 100° C. Thus in test 1, essentially no variation was indicated in the presence of the concentrate, either with respect to the iodine number or the peroxide number. Concerning test 2, the change in the iodine number was relatively negligible despite the rigid test conditions, and the peroxide number actually revealed the phenomenon of a reduction as a result of the attendant heat treatment in the presence of the concentrate.

As for test 3, the iodine number remained unchanged by the heating conditions, while the peroxide number revealed an increase. This result suggests that the antioxidant and stabilizing effectiveness of the concentrate type products herein is at a maximum in connection with compositions or products embracing a substantial extent of unsaturation, and especially polyunsaturated ingredients such as polyunsaturated fatty acids. In this connection, lard is comparatively low in such unsaturates, and especially polyunsaturates, as compared with the various animal or vegetable oils, such as those of soy bean, cod liver, safflower, wheat germ or other derivation.

The results of test 4 also emphasize the stabilizing effect of the concentrate product as applied to safflower oil, insofar as relates to the iodine number. With respect to the peroxide number, as in test 2, a substantial reduction is shown, thereby at least indicating that any oxidative degradation or development of rancidity has been completely inhibited.

The significance of test 5 pertains to the indication therein that a variation of the concentrate type product with respect to the combined lecithin-tocopheral content in the approximate ratio of 10:1, comprising a reduction to the comparatively low amount of 5% of the complete composition tested, nevertheless affords comparably effective stabilizing and antioxidant properties. Thus the results of this test show that the iodine and peroxide numbers, after 500 hours at 100° C., were substantially unaffected with regard to cod liver oil.

Test 6 is indicative of the stabilizing effect which may be afforded by the concentrate product A when in very low percentage as compared with the weight of the total formulation. Thus 0.25% of the concentrate product was found to afford a substantial extent of stabilization to the unsaturates in the cod liver oil, as evidenced by the insignificant change in the iodine number, and while some deviation in the peroxide number is manifested, this does not appear to be unduly excessive, although a higher content of concentrate A, as 12.9% thereof, will in effect obviate such oxidation.

The purport of test 7 comprises the adaptation, in the maximal amount of 25%, of concentrate A, and thereby affords a basis of comparison with the aforesaid test 3, which utilized 12.8% of the said concentrate product likewise for the stabilization of lard. It will be noted that the results in terms of effect on the iodine number and peroxide values are precisely the same in the two tests, which is suggestive of the impracticability and lack of necessity in utilizing an excessive weight proportion of concentrate product for attaining an effective stabilizing function.

In this latter connection, the weight ratio of concentrate product to any formulation wherein it is utilized as a stabilizing agent may vary within the range of 0.25% to 25%, as above indicated, dependent upon the composition, or components therein, which are the subject

| Test No. | Oil Stabilized | Iodine No. Before Test | Iodine No. After Test | Peroxide No. Before Test | Peroxide No. After Test |
|---|---|---|---|---|---|
| 1 | Soy Bean | 109 | 107 | zero | zero |
| 2 | Fresh Cod Liver Oil. | 112 | 108 | 60 | zero |
| 3 | Fresh Rendered Lard. | 77 | 77 | 12 | 20 |
| 4 | Safflower | 127.6 | 127.2 | 96 | 56 |
| 5 | Cod Liver Oil (containing concentrate providing 5% of combined lecithin and tocopherol). | 128 | 127 | 36 | 34 |
| 6 | Cod Liver Oil (Stabilized by 0.25% Concentrate A). | 128 | 127.4 | 136 | 104 |
| 7 | Fresh Rendered Lard (stabilized by 25.0% Concentrate A). | 77 | 77 | 12 | 20 | of preservation, the content of lecithin and tocopherols in the concentrate product, and the like, particularly with respect to retention of unsaturation and inhibiting oxidative degradation or rancidity. However the generally optimal proportion has been found to be in the approximate range of 7.5% to 15%, with 10% to 14% usually manifesting preferred effectiveness, with respect to the stringent conditions comprising the heating at 100° C. for 500 hours.

As previously stated, the unusual stabilizing and antioxidant characteristics of the concentrate product definitely appear to be suggestive of the production of a complex type substance embodying either the lecithin and tocopherol per se, or also embracing the unsaturates or the multibonded group or moiety of the unsaturated fatty acids. Differently stated, the preparation of a lecithin-tocopherate or a lecithin-tocopherol-unsaturated ingredient complex results from the combination of ingredients utilized in preparing the optimum concentrate type of product, pursuant to the critical aspects involved, including the presence of additive lecithin and additive tocopherols in the approximate range proportions of 5:1 to 20:1 and within the percentage ranges designated above, as well as the heat treatment within the critical temperature ranges described herein.

The indication that such complex products are formed under the designated circumstances is afforded by the results of ultraviolet and infrared spectrophotometer types of tests. Thus tocopherols manifest generally characteristic lines in the ultraviolet light, while lecithin similarly provides lines indicative thereof under infrared conditions of test. However it has been found that while a composition containing both lecithin and tocopherols within the proportion ranges referred to hereinabove initially reveals their respective characteristic lines under the pertinent spectrophotometer analysis, subsequent to the conversion of such compositions to the concentrate products, by heating within the temperature range of 80° C. to 90° C., and optimally at 85° C., in accordance with the percentage content as well as ratio of the lecithin and tocopherol of the invention, such lines are substantially eliminated. In view thereof, the said lecithin and tocopherol content of the concentrate product has seemingly been appropriated by some relevant reaction involving these components, such as by the formation of an aforesaid complex type of product. Thus without intending to be restricted to any theory or explanation, the synergistic function as well as the antioxidant and stabilizing characteristics of the concentrate may be in substantial measure the result of the aforesaid complex product which is attained.

While antioxidant compositions are known which may comprise a vegetable oil, embodying additive lecithin, and also refer to the presence of tocopherols therein, the relative amounts of the ingredients are utterly at variance from that within the purview of the present invention. In brief, there has been no realization heretofore that substantial additive amounts of tocopherols along with lecithin, in appropriate proportion ranges, are adapted to afford the striking antioxidant or stabilizing function which is attainable pursuant to the present invention, through the formation of what definitely appear to be lecithin-tocopherol compounds or complexes of lecithin-tocopherol-unsaturated fatty acid moieties or compounds embracing the same.

As previously stated, the present invention contemplates the inclusion of tocopherol as an additive component, in the products within the latitude of the invention, to a minimal extent or amount which is several hundred fold with respect to the tocopherol content naturally occurring in the oils or the like present as ingredients, the maximum amounts embraced by the ranges disclosed herein being comparably greater. In this connection, it is generally recognized that the usual functioning of tocopherols is similar to the characteristics of enzymes, hormones, or possibly catalysts, in that relatively minor amounts are utilized for affording their usual effects, particularly in orally ingestible substances, with excess quantities being superfluous to all intents and purposes.

However pursuant to the present contemplation, tocopherols are supplied to the oleaginous substances in unusual excess amounts, which in terms of the normal practice would be deemed as surplus waste. As a result of the combinative association of such a significantly enlarged content of additive tocopherol, and a similarly substantial excess of additive lecithin, both with respect to the tocopherols and from the standpoint of the normal utilization thereof, as indicated by the percentage ranges herein applicable to these components as well as their ratio range, an entirely novel type of product or composition is afforded which appears to be a complex, as aforesaid. Differently stated, and apart from any synergistic effects, the comparatively excess amounts of the tocopherols as well as of the lecithin, particularly with the lecithin-tocopherol ratio being in the range of 5:1 to 20:1 and especially within the optimal range of 10:1 to 14:1, are suggestive of a criticality in the obtention of the products and compositions manifesting the enhanced attributes of the invention, when the components are heated within the critical temperature range of 80° C. to 90° C., preferably at approximately 85° C.

In summary, the invention affords oleaginous products or compositions having a high content of unsaturated ingredients, including polyunsaturates, primarily of the fatty acid type or derivation, and manifesting unusual stability both with respect to retaining the extent of unsaturation characteristic thereof and in regard to the inhibition of oxidative deterioration or rancidity. Moreover these products provide unusual biological or physiological properties, as orally ingestible substances. Among their optimum adaptations, the compositions herein comprise feed supplements, affording enhancement in growth, development, accelerated breeding and improvement in the physical characteristics of the recipient. Moreover therapeutic and pharmaceutical properties are likewise attributable to the compositions illustrated by the formulations herein. Apart from these factors, novel antioxidants and stabilizing products are attained.

While the invention has been described in accordance with preferred embodiments and adaptations thereof, it is apparent that many changes and modifications may be made in the compositions or products obtained, and variations resorted to in their adaptations or fields of usage, as well as in the details of procedure relevant to their preparation, without departing from the spirit of the invention as set forth in the following claims.

We claim:

1. A composition for animal ingestion comprising an animal feed containing a feed supplement comprising essentially as its preponderant ingredients an edible oleaginous substance having a substantial content of unsaturates including polyunsaturated components, a proportion of additive lecithin within the range of approximately 2.5% to 11% by weight of the feed supplement, and additive mixed tocopherols in the approximate range of 0.25% to 2% by weight of the feed supplement, the ratio of lecithin to tocopherol being within the approximate range of 5:1 to 20:1, at least the additive lecithin and tocopherols content having been subjected to heat treatment at a temperature within the approximate range of 80° C. to 90° C. in the presence of each other and in the presence of at least a portion of the said edible oleaginous substance.

2. An orally ingestible composition of unusual stability comprising essentially as its preponderant ingredients an edible oil of natural derivation having a high content of unsaturates including polyunsaturates, a proportion of added lecithin within the range of approximately 2.5% to 11% by weight of the composition, and added mixed tocopherols within the approximate range of 0.25% to 2% by weight, the proportion of lecithin to tocopherols being in the approximate range of 5:1 to 20:1, at least the additive lecithin and tocopherols content having been heated to a temperature within the approximate range of 80° C. to 90° C. in the presence of each other and in the presence of at least a portion of the edible oil.

3. An orally ingestible composition of unusual stability comprising essentially as its perponderant ingredients an edible vegetable oil having a high content of unsaturates and including polyunsaturates, a proportion of added lecithin within the range of approximately 6% to 8% by weight of the composition, and added mixed tocopherols within the range of approximately 0.5% to 0.6% by weight of the composition, the proportion of lecithin to tocopherols being within the approximate range of 10:1 to 14:1 parts by weight relative to each other, the lecithin and tocopherol content having been heated to a temperature of approximately 85° C. in the presence of each other and in the presence of at least a portion of the vegetable oil.

4. The method of preparing an orally ingestible composition of unusual stability which comprises the following sequence of steps: (a) admixing a minor amount of a phenolic antioxidant compound in an edible oil having a substantial content of unsaturates including polyunsaturated components, heating the admixture at a temperature within the approximate range of 65° C.–70° C., while stirring, to dissolve the said antioxidant, adding to the solution a preponderance of lecithin, slowly heating the resultant mixture while stirring at a temperature within the approximate range of 80° C.–90° C. for approximately 5 minutes; (b) separately mixing a minor amount of a gallate ester antioxidant in a glycol solvent therefor, and heating this mixture while stirring to effect the solution of the said gallate ester; (c) admixing the solutions of steps (a) and (b), adding to the resultant admixture a substantial amount of mixed tocopherols and a minor amount of mixed vitamins A and D, the content of added lecithin at this stage being in the approximate range of 30% to 70% by weight of the composition with the added tocopherols being in the aproximate range of 2.6% to 14% by weight, reheating the mixture while stirring for approximately 5 minutes at a temperature within the approximate range of 80° C.–90° C., and cooling the product; (d) adding to the said product a preponderance of at least one edible oil having a high content of unsaturates including polyunsaturated components, whereby the content of the added lecithin in the ingestible composition is in the approximate range of 2.5% to 11% by weight with the added tocopherols being in the approximate range of 0.25% to 2.0% by weight, and heating the overall composition while stirring at a temperature within the approximate range of 80° C.–90° C. for approximately 10 minutes.

5. The process as in claim 4, wherein step (c) is supplemented by admixing with the solutions of steps (a) and (b), prior to the addition of the mixed tocopherols, a separately prepared composition comprising animal lipids heated with continuous agitation in a vegetable oil having a high content of unsaturates including polyunsaturated components at a temperature within the approximate range of 80° C.–90° C. for an interval of approximately 5–10 minutes.

6. The process as in claim 4, wherein step (d) is supplemented by admixing animal lipids with the preponderance of edible oil supplied during this step.

7. The process as in claim 5, wherein the phenolic antioxidant and edible oil of step (a) comprise, 2,6-di-tert-butyl-4-methyl-phenol in wheat germ oil; the gallate ester antioxidant in glycol solvent comprises propyl gallate in propylene glycol; the edible oil of step (d) comprises a mixture of soy bean oil in preponderance with a substantial quantity of additional wheat germ oil and with a lesser amount of additional corn oil; and the temperature of heating within the range of 80° C. to 90° C. is 85° C.

8. The process as in claim 6, wherein the phenolic antioxidant and edible oil of step (a) comprise 2,6-di-tert-butyl-4-methyl-phenol in corn oil; the gallate ester antioxidant in glycol solvent comprises propyl gallate in propylene glycol; and the edible oil of step (d) comprises a mixture of soy bean oil in preponderance with a substantial quantity of wheat germ oil and with a lesser amount of additional corn oil; and the temperature of heating within the range of 80° C. to 90° C. is 85° C.

9. The method of preparing an orally ingestible product adapted as a stabilizing composition which comprises admixing a minor amount of a phenolic antioxidant compound in an edible oil having a substantial content of unsaturates including polyunsaturates, heating the admixture while stirring to dissolve the antioxidant, adding lecithin to the solution in an amount within the approximate range of 30% to 70% by weight of the composition, slowly heating the resultant admixture at a temperature within the approximate range of 80° C. to 90° C. for approximately 5 minutes while stirring, adding to the resultant admixture a solution of a gallate ester in a glycol solvent, then admixing an amount of mixed tocopherols in the approximate range of 2.6% to 14% by weight, the weight ratio of lecithin to tocopherol being in the approximate range of 5:1 to 20:1, and heating the resultant product while stirring for about 5 minutes at a temperature within the approximate range of 80° C. to 90° C., and cooling the product.

10. The method as in claim 9, wherein the added lecithin is in the approximate amount by weight of 50% to 70%, the added tocopherol comprises mixed tocopherols in the approximate amount by weight of 4% to 6%, and the heating temperature is 85° C.

11. A concentrate product adapted per se for oral ingestion and as a stabilizing component of an orally ingestible composition, comprising essentially as its preponderant ingredients an edible oil of natural derivation having a high content of unsaturates including polyunsaturates, added lecithin and added tocopherols in a combined content within the approximate range of 35% to 80% by weight of the product, the lecithin content being within the approximate range of 30% to 70% by weight and the tocopherols are in the approximate range of 2.6% to 14%, the respective lechithin to tocopherol contents being in the approximate proportion of 5:1 to 20:1, the said product having been subjected to a heat treatment in the approximate temperature range of 80° C. to 90° C.

12. A concentrate product adapted per se for oral ingestion and as a stabilizing component of an orally ingestible composition, comprising essentially as its preponderant ingredients an edible oil of natural derivation having a high content of unsaturates including polyunsaturates, added lecithin in the approximate range of 50% to 70% by weight of the product, and added mixed tocopherols in the approximate range of 4% to 6% by weight of the product, the respective lecithin to tocopherol proportions being in the approximate range of 10:1 to 14:1, the said product having been subjected to a heat treatment at a temperature of approximately 85° C.

13. A concentrate product adapted per se for oral ingestion and as a stabilizing component of an orally ingestible composition, comprising essentially as its preponderant ingredients an oil from the group consisting of wheat germ oil and corn oil having a minor non-toxic content of 2,6-di-tert-butyl-4-methyl-phenol, added lecithin and added mixed tocopherols in a combined content within the approximate range of 55% to 75% by weight of the product, and a minor non-toxic content of propyl gallate dissolved in propylene glycol, the respective lecithin to tocopherol proportions being in the approximate range of 10:1 to 14:1, the said product having been subjected to a heat treatment of approximately 85° C.

14. An orally ingestible composition comprising an oleaginous substance having a substantial content of unsaturates, the said composition containing in admixture therewith a concentrate product comprising essentially as its preponderant ingredients an edible oil together with added lechithin and added tocopherols, the said oil having a high content of unsaturates including polyunsaturates, the lecithin content of the said concentrate product being in the approximate range of 20% to 70% with the tocopherol content being in the approximate range of 2.6% to 14% by weight, the respective lecithin to tocopherol proportions being in the approximate range of 5:1 to 20:1, the said concentrate product having been subjected to a heat treatment in the approximate temperature range of 80° C. to 90° C., the over-all content in the ingestible composition of additive lecithin being at least 2% by weight thereof and the additive tocopherol therein being in a minimum amount of 0.2% by weight.

References Cited in the file of this patent

UNITED STATES PATENTS 2,835,584     Rosenberg _____ May 20, 1958
2,890,959     Phillips _____ June 16, 1959

OTHER REFERENCES

"Handbook of Material Trade Names," by Zimmerman and Lavine, 1953 edition, Industrial Research Service, Dover, New Hampshide, p. 301. (Copy in Div. 63.)